No. 840,930. PATENTED JAN. 8, 1907.
G. T. GLOVER.
MOTOR VEHICLE.
APPLICATION FILED FEB. 10, 1906.

8 SHEETS—SHEET 1.

Witnesses:
Harry R. L. White
Ray White

Inventor
George T. Glover
By Chas. G. Page
Att'y.

No. 840,930. PATENTED JAN. 8, 1907.
G. T. GLOVER.
MOTOR VEHICLE.
APPLICATION FILED FEB. 10, 1906.

8 SHEETS—SHEET 2.

Witnesses:
Harry R. L. White.
Ray White

Inventor
George T. Glover
By Chas. G. Page Atty.

No. 840,930. PATENTED JAN. 8, 1907.
G. T. GLOVER.
MOTOR VEHICLE.
APPLICATION FILED FEB. 10, 1906.

8 SHEETS—SHEET 5.

Witnesses:
Harry R. L. White
Ray White

Inventor
George T. Glover
Chas. G. Page Atty.

No. 840,930. PATENTED JAN. 8, 1907.
G. T. GLOVER.
MOTOR VEHICLE.
APPLICATION FILED FEB. 10, 1906.

8 SHEETS—SHEET 6.

Witnesses
Inventor
George T. Glover
By Pennie & Goldsborough
Attorneys

No. 840,930. PATENTED JAN. 8, 1907.
G. T. GLOVER.
MOTOR VEHICLE.
APPLICATION FILED FEB. 10, 1906.
8 SHEETS—SHEET 7.
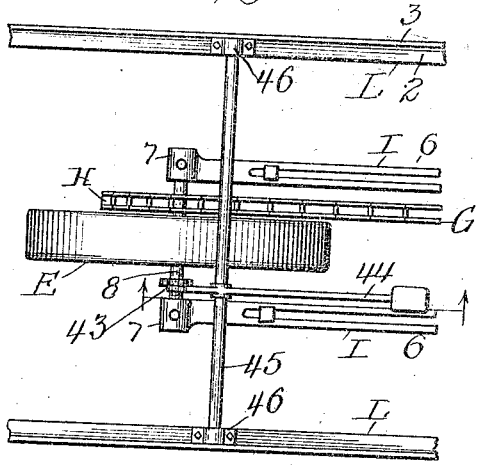
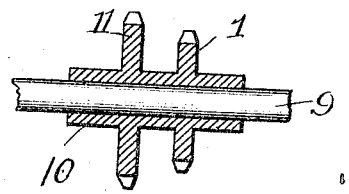
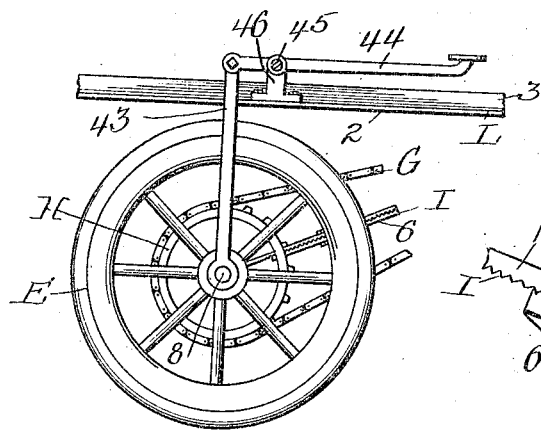
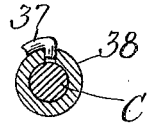
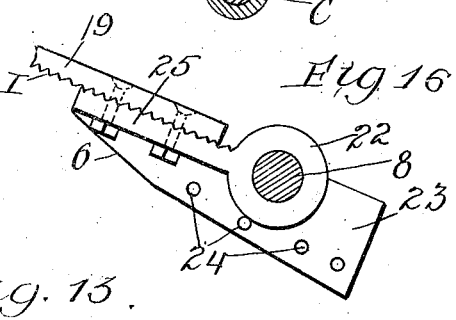
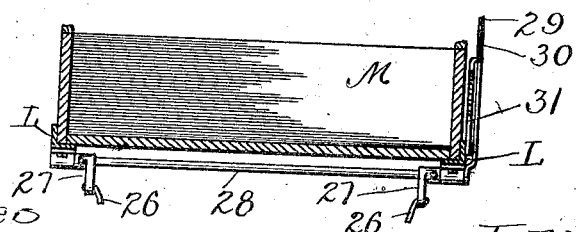
Witnesses
Ray White
Harry R. L. White
Inventor:
George T. Glover
By Chas. G. Page Atty.

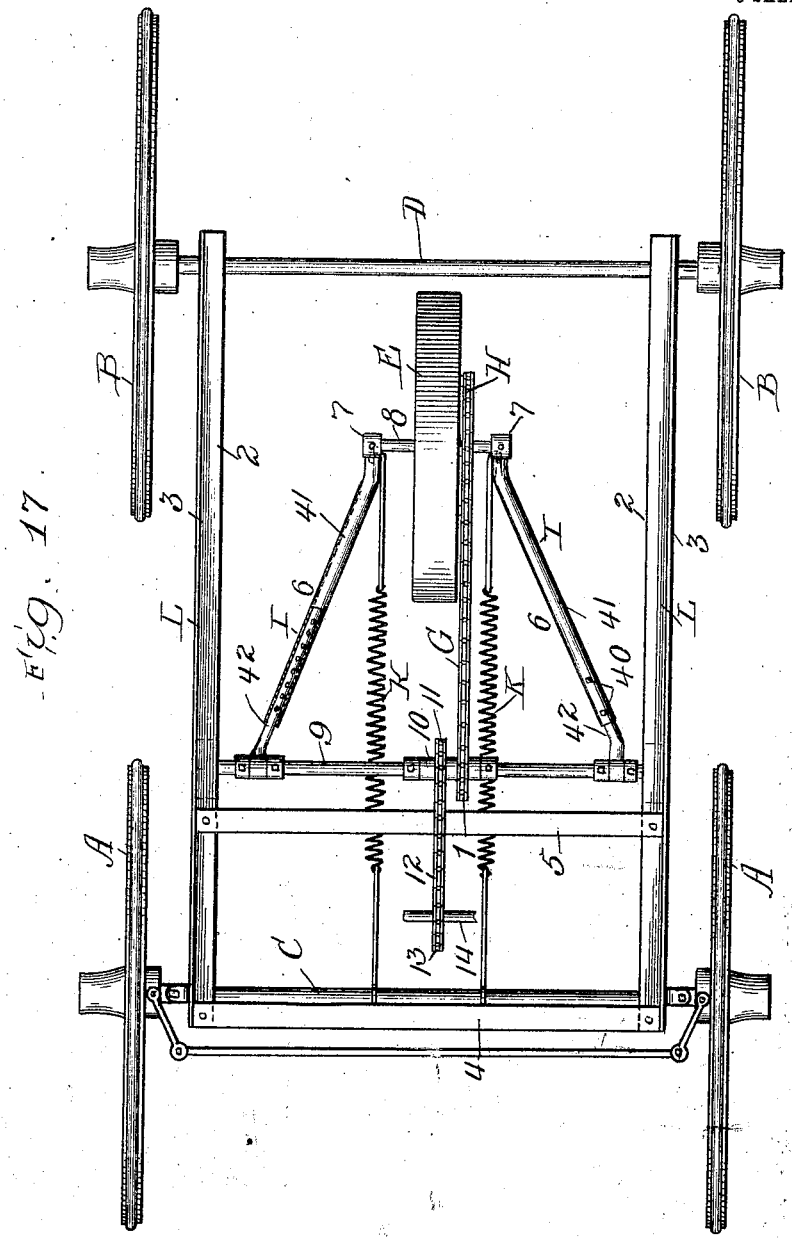

UNITED STATES PATENT OFFICE.

GEORGE T. GLOVER, OF CHICAGO, ILLINOIS.

MOTOR-VEHICLE.

No. 840,930.      Specification of Letters Patent.      Patented Jan. 8, 1907.

Application filed February 10, 1906. Serial No. 300,488.

*To all whom it may concern:*

Be it known that I, GEORGE T. GLOVER, a citizen of the United States, residing at Chicago, in the county of Cook and State of Illinois, have invented certain new and useful Improvements in Motor-Vehicles, of which the following is a specification.

Objects of my invention are to provide a motor-vehicle with a simple and reliable traction propelling device; to cause the traction-wheel of the traction propelling device to traverse an uneven or irregular road-bed without material shocks or jolts and without material loss of rolling friction; to automatically throw more or less of the weight of the vehicle upon the traction-wheel, according to requirements; to materially overcome jolts and jars while the vehicle is running over rough roads; to vary the traction adhesion or rolling friction of the traction-wheel according to demands; to provide an easy-running and easily-manipulated motor-vehicle, and to provide various further and improved matters of detail, combination, and arrangement.

Figure 1:
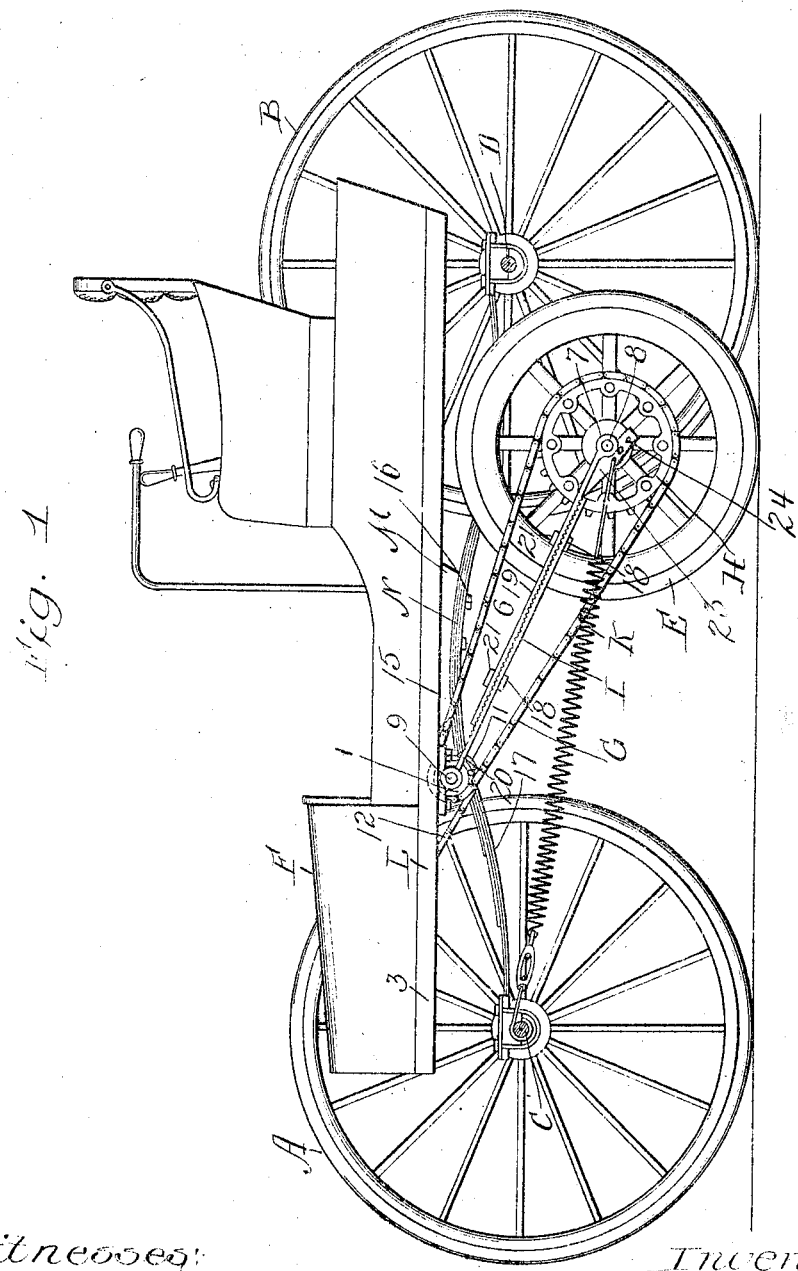
Figure 2:
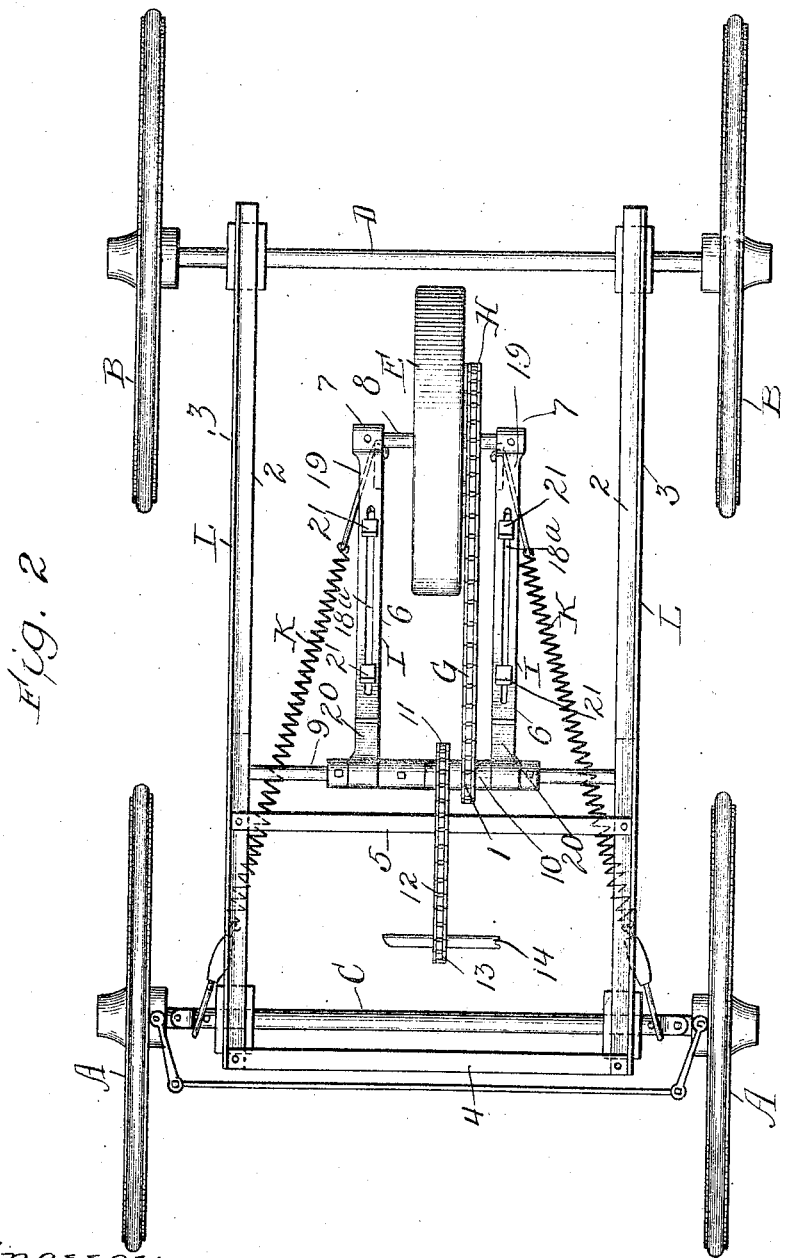
Figure 3:
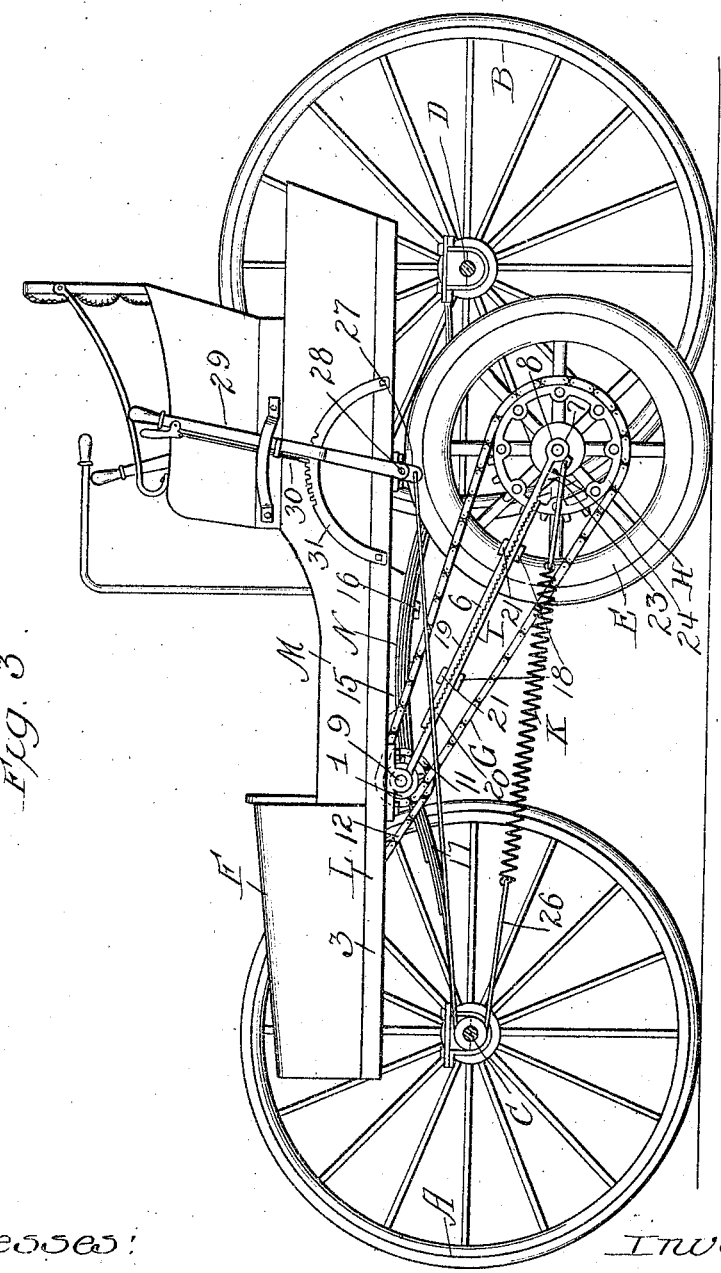
Figure 4:
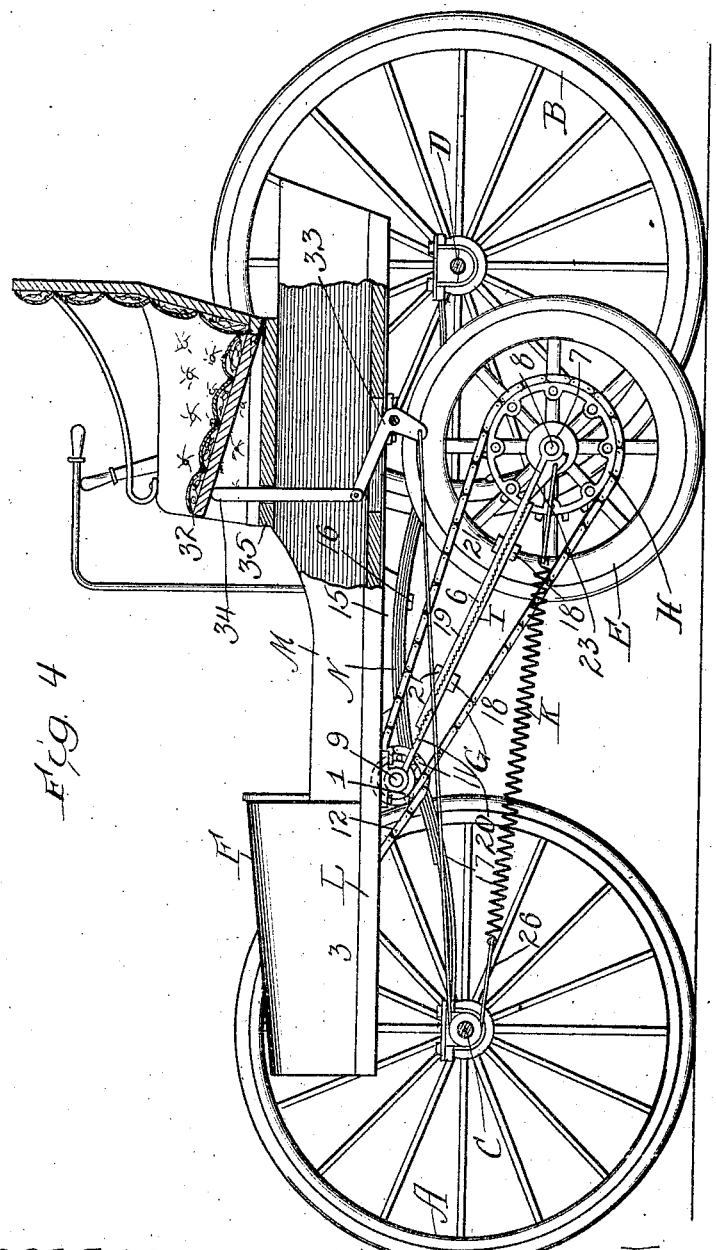
Figure 5:
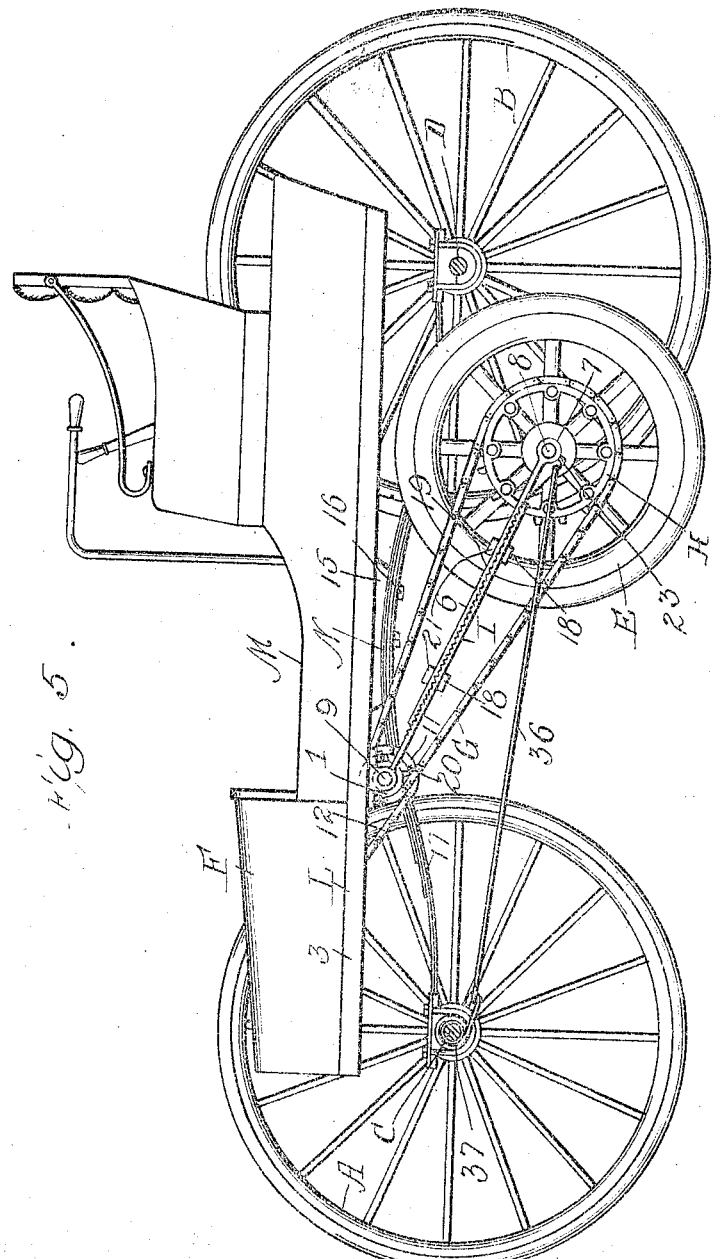
Figure 6:
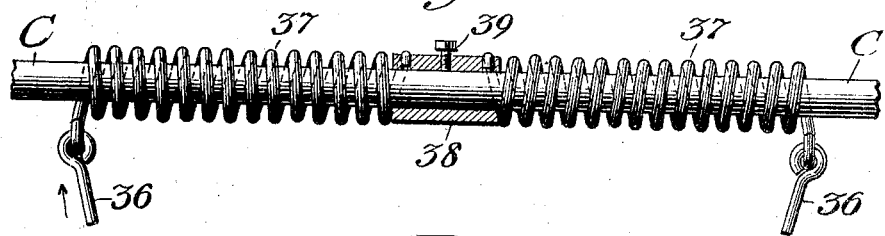
Figure 7:
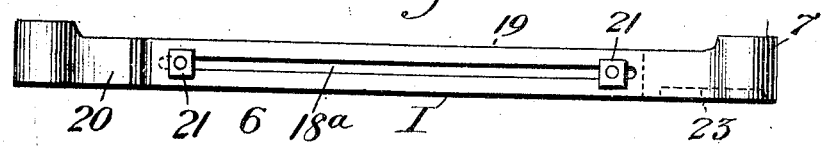
Figure 8:
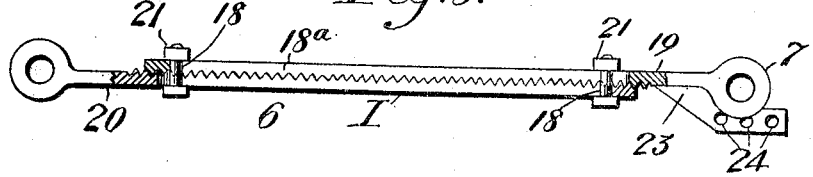
Figure 9:
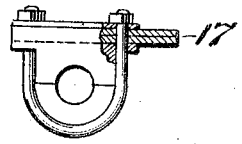
Figure 10:
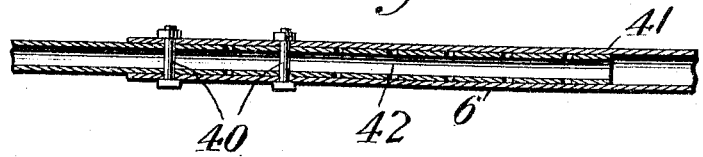

In the accompanying drawings, Figure 1 is a side elevation of a motor-vehicle embodying the principles of my invention. Fig. 2 is a top plan view of Fig. 1 with the box M and the engine F removed from the main body-frame. Fig. 3 shows the motor-vehicle in side elevation with hand-controlled means for adjusting the spring-power. Fig. 4 is a view similar to Fig. 3, but showing somewhat-different means for adjusting the spring-power. Fig. 5 is a side elevation of a motor-vehicle having a torsion-spring substituted for the form of tension-spring shown in preceding figures. Fig. 6 is an enlarged detail illustrating two sections of the adjustable torsion-spring. Fig. 7 is an enlarged plan view of one of the parts or members of the thrust or tension frame. Fig. 8 is a longitudinal section of Fig. 7. Fig. 9 illustrates, partly in elevation and partly in section, a clamp device for securing an end of one of the side springs upon one of the axles. Fig. 10 is an enlarged detail showing in longitudinal section tubular telescoping portions of one of the parts or arm portions of the arm or swinging frame illustrated in Fig. 17. Fig. 11 is a detail illustrating in top plan a device for raising and lowering the traction-wheel. Fig. 12 is a side elevation of the device for raising and lowering the traction-wheel. Fig. 13 is a section taken transversely through the body-frame and box and shows in elevation a rock-shaft for varying the tension of the tension-springs hereinafter more particularly described. Fig. 14 is an enlarged detail showing in longitudinal section a rotary hub or sleeve provided with two sprockets for driving belt. Fig. 15 is an enlarged detail showing in cross-section one end of a spring attached to sleeve 30 on a rod or axle. Fig. 16 is a detail showing a modified form of the rear end portion of one of the parts of the thrust or tension arm or frame I. Fig. 17 is a top plan view of the machine with the box removed and shows the parts 6 of the arm or frame I diverging from the axle of the traction-wheel and the tension-springs arranged relatively parallel.

The motor-vehicle thus illustrated, is provided with front and rear running-wheels A and B and a body-frame secured upon springs, which are in turn secured upon the front and rear axles C and D. For the broader purposes of my invention the "body" or "body-frame," as it may be indifferently termed, can be of any known or suitable construction, and while it is desirably seated upon springs it could be secured upon the axles or bolsters thereon without the intervention of springs.

The wheels A and B are ordinary supporting or running wheels, the propulsion of the vehicle being effected by a traction-wheel E, which is arranged under the body and driven from any suitable engine F by power-transmitting connection, which, as illustrated, involves an endless driving-belt G engaging a sprocket H, rigid with the traction-wheel. The traction-wheel is journaled in suitable bearings on an arm or frame I, constructed with one or more longitudinal component parts and having its upper end hinge, connected with the body-frame of the vehicle. This arm or frame normally inclines downwardly and is provided with the traction-wheel at a point below its point of hinge connection with the body-frame. As a preferred arrangement the swinging arm, frame, or member thus provided with the traction-wheel is shown as trailing or inclined downwardly and rearwardly from its hinge connection with the body-frame, and as a gear connection between the engine and the traction-wheel on the swinging arm or frame I prefer to employ the endless driving chain or belt G, trained about the traction-wheel sprocket H and also trained upon an upper driving-sprocket 1, which is driven from the engine, the sprocket 1 for thus operating the driving-belt and the arm or frame I being arranged to respectively revolve and swing about a common axis.

During operation the arm provided with the power-driven traction-wheel is constantly urged by spring-power to swing from an inclined position toward a pendent vertical position, and hence it is urged by such spring-power in direction to bring the axis of the traction-wheel nearer toward a point directly under the axis about which such arm or frame is hung. This action increases the traction or tractive power or rolling adhesion of the wheel E proportionally to the force exerted by the spring and the extent to which the arm or frame I takes a portion of the weight of the vehicle.

In the first four figures of the drawings the arm or frame is urged to swing forward by tension-springs K K, connected with the lower rear end portion of the swinging arm or frame and extending forwardly therefrom on a line or lines under the axis about which the arm or frame is hung to swing, the forward ends of the springs being attached to the front axle in any suitable way. These springs are normally under suitable tension, and while urging the arm or frame to swing about its axis they necessarily exert a forward draft on the axis of the traction-wheel and likewise a draft on the traction device comprising the arm or frame and traction-wheel in a direction tending to raise the body-frame, and thereby relieve the front wheels A of certain weight which is taken and sustained by the traction-wheel. As an illustration of this fact it will be seen that the spring could be made sufficiently powerful to cause the arm or frame I to actually swing forward to a vertical or nearly vertical position, and thereby bring the traction-wheel directly under the axis about which the arm swings and lift the forward end of the vehicle clear of the ground and that to cause the arm or frame to swing back to a suitable angle it would be necessary to weight down the vehicle. As another feature incident to operation the traction-wheel maintains a suitable degree of tractive power while running over elevations and into depressions along the road and also causes the motor-vehicle to climb up grades with ease. The upper leaf of the link-belt also exerts a pull on the sprocket H in a direction tending to draw the traction-wheel forward, thereby causing a draft tending to swing the arm or frame I forwardly and further induce forward end thrust on the part of the same.

Where the arm or frame I is hinged to the body-frame forward of a point midway of the length of the latter, the lifting tendency of the arm or frame will be mainly exerted to lift the forward end portion of the body-frame, and where the latter is spring-supported a slight lift of its forward end portion will proportionally relieve the front running-wheels of its weight. It will also be observed that while the traction device is thus lifting or attempting to lift the weighted body-frame or one end thereof the traction-wheel is running in a direction counter to any disposition of the vehicle to back on the rear wheels.

Broadly considered, the arrangement of arm or frame, springs, and traction means shown could be reversed so as to arrange the arm or frame I to incline downwardly and forwardly, and thereby act as a pull-bar; but I regard the arrangement shown and involving a swinging push arm or frame I as possessing various advantages over the reverse of such arrangement. It will be seen, however, that when the vehicle is backed the arm or frame I operates as a pull-bar.

With reference to further matters of improvement, the body-frame (best shown in Fig. 2) is constructed with two longitudinally-extending side bars L L, each of which is an angle-bar. These angle-bars are arranged with their horizontal flange portions 2 projecting inwardly from their vertical flange portions 3, thereby forming a frame-seat for a box M, Fig. 1, with which the vehicle can be provided. The box can be suitably secured to these angle-bars, and, as shown in Fig. 2, cross-bars 4 and 5 are secured to the angle-bars for the purpose of supporting the engine. While the engine can be arranged on the rear portion of the body-frame, I prefer to arrange it forward, substantially as illustrated.

In Fig. 2 the swinging arm or frame I comprises two component parts or bars 6 6, having their lower rear end portions provided with bearings 7 7 for an axle 8, upon which the traction-wheel E and the sprocket H are secured. The coiled springs K K have their rear ends attached to the lower portions of the bars 6, the forward ends of such springs being connected with the front axle by connections whereof each desirably involves a suitable adjusting-swivel or like means for varying the tension of the spring. As these springs are under constant tension, so as to form spring draft devices exerting constant pull or draft on the swinging arm or frame I, they are desirably made of considerable length, as illustrated, so that when the traction-wheel drops into a depression along the road they will still have all necessary retractile energy, and thereby maintain suitable frictional adhesion or rolling friction on the part of the wheel. It will also be observed that when the traction-wheel thus suddenly runs or drops into a depression the springs draw the arm or frame I forward, and thereby tend to raise the forward end of the body-frame, and also that as the weight of the body-frame tends to depress the upper end of the frame or arm I and push back the traction-wheel against the retractile energy of the springs sudden concussions or jars are largely avoided. The forward ends of the parts of the frame or arm 6 6 are hung upon a cross-rod 9, having its ends supported by bearings on the side bars L L, thereby providing a simple, compact, and durable arrangement. The upper sprocket 1 for the driving-belt G is rigid upon a hub or sleeve 10, arranged to turn upon the rod 9, and this hub or sleeve 10 is also provided with a sprocket 11, which is rigid thereon and driven by an endless belt 12 from a sprocket 13 on the rotary engine-shaft 14, as best shown in Fig. 2. The hub or sleeve 10, with the two sprockets thereon, is also shown in Fig. 16.

The vehicle as shown is provided with two side springs N, respectively under and secured to one and the other of the side bars L of the body-frame, it being observed that while the rear side spring is shown in Fig. 1, for example, the presence of a corresponding spring at the opposite side of the vehicle is understood. The springs can be secured to the body-frame in any suitable way. For example, between each side bar and the spring thereunder is a block or bearing 15, the bar, block, and spring being secured together by bolts 16.

The body-spring N, the arm or frame I, and the tension-springs form a spring-truss provided with a traction-wheel and adapted to absorb or take up shocks or jolts. In Fig. 1, for example, the portion 17 of spring N forward of the point of securement of the spring to the body-frame, the tension or traction spring K, and the arm or frame I combine to form a spring-truss provided with the traction-wheel E.

The arm or frame I is preferably made adjustable in length for the purpose of taking up slack in the endless driving-belt G. As shown, each part 6 of the arm or frame I is constructed with two sections having opposite tooth-faces, which are held in engagement the one with the other by clamping means, such as by bolts 18 (see Figs. 7 and 8) extending through longitudinal slots 18ª in the engaging sections 19 and 20, the bolts being provided with adjustable clamp-nuts 21. Any suitable construction of belt-tightener can, however, be employed.

The rear ends of springs G are attached to or connected with the rear end portion of the swinging push or tension arm or frame I, it being observed that the nearer such point of connection is to the lower end of such frame or arm the greater will be the leverage. In several of the figures the rear end portion of each part 6 of the arm or frame I has a bearing 7 for the axle of the traction-wheel and a flange or web 23, to which the rear end of a spring-section K is attached. In Fig. 1 this web or flange 23 has a line of holes 24, whereby the end of spring K can be attached to the arm or frame I, either forward or under or in rear of the axis of the traction-wheel. This is further illustrated in Fig. 8, and in Fig. 16 the swinging arm or frame section 19 is bolted to an arm-plate 25, provided with the bearing 22 and also made with flange or web 23, having a line of holes 24. In Fig. 2, for example, the springs or spring-sections K, which practically combine to form one spring, diverge forwardly from their connections with parts 6 of the arm or frame I, and these parts 6 of the said arm or frame are shown parallel the one with the other. In Figs. 17 and 10 the parts 6 of the arm or frame I diverge forwardly and the spring lengths or sections K are relatively parallel, and in this way the thrust or tension arm or frame is hung on the rigid rod 9 at points near the side bars of the body-frame.

In Fig. 3 the spring or spring-section K has its forward end attached to a cable 26, which is understood to pass about a suitable sheave on the front axle and thence back to an arm 27 on a rock-shaft 28. With this arrangement a hand-lever 29 is secured to the rock-shaft 28 and provided with a thumb-latch 30 for engaging a rack-segment 31. In this way a person on the vehicle can control the tension of the spring by adjusting the hand-lever. The rock-shaft 28 is understood to be provided with two arms 27 for two cables connected with two springs or spring-sections K, in accordance with the principle illustrated in Fig. 3, a further partial illustration of such arrangement being shown in Fig. 15.

In Fig. 4 the arrangement of spring means and cables is understood to be the same as in Fig. 3, the cables, however, being attached to bell-cranks secured on rock-shaft 28, which can be operated by a tilting seat 32. For example, the near cable (shown in said figure) has one end attached to the short arm of a bell-crank 33, a vertically-arranged slide and push-rod 34 being pivoted at its lower end to the long arm of the bell-crank and extended up through a guide-opening in the rigid seat box or frame 35, so as to project upwardly and under the hinged seat, it being understood that for the other like spring or spring-section a duplicate of such arrangement is provided. When, therefore, one or more occupants sit upon the seat, the latter will be depressed, and thereby increase the tension of the spring-sections.

In Figs. 5 and 6 rods or cables have their rear ends attached to the lower end portions of parts 6 of the arm or frame I, the forward ends of these rods or cables 36 being attached to a torsion-spring device arranged upon the front axle and adjusted so as to be under tension.

As shown in Fig. 6, the torsion-spring device comprises a couple of torsion-spring sections 37 37, arranged upon a transverse rod—for example, the front axle—the inner adjacent ends of these spring-sections being secured to a sleeve or bearing 38, arranged for rotary adjustment on the rod or axle and held in such adjustment by locking means, such as a set-screw 39.

In Figs. 10 and 17 each part 6 of the arm or frame I is composed of two telescoping tubular sections, which can be relatively adjusted for taking up slack in the driving-belt and held in such adjustment by a locking device, such as bolts 40 inserted through registering holes in the tubular telescoping sections 41 and 42.

When desired, I can also provide means for temporarily raising the traction-wheel from the ground and so holding it while the engine is running. The lifting device for such purpose (shown in Figs. 11 and 12) comprises a swinging link 43, having its lower end pivotally connected with the axle of the traction-wheel and having its upper end pivoted to one end of a foot-lever 44, which is fulcrumed at 45 upon a bearing 46 on the body-frame. By this arrangement the traction-wheel can be lifted before starting the engine and kept in such position until the engine is started and a high degree of rotation on the part of the traction-wheel attained, or, if desired, the wheel while running can be quickly raised from the ground.

The attachment of the tension or traction spring to the axle as illustrated constitutes a matter of special improvement, although, broadly considered, such spring could be attached to the body-frame by suitable connection.

I have found in practice that I can make the spring which urges the axle of the traction-wheel toward a point under the hinge connection between the arm or frame I and the body-frame of sufficient strength to fairly raise one end of the vehicle from the ground, particularly when the engine is of sufficient power, and hence in the same case it becomes desirable to limit the extent to which the arm or frame I can be swung from its inclined position toward an upright position, a simple illustration of means for thus limiting the extent of swing on the part of the arm or frame I being a cable connecting such arm or frame I with the body-frame and normally slack to a suitable extent.

Where the swinging arm or frame trails or inclines downwardly and rearwardly, as illustrated, the traction-spring acting on such arm or frame and the forward pull of the upper leaf of the belt G tend to swing such arm or frame from an inclined position forwardly toward an upright position, so that when the engine is running in a direction to advance the traction-wheel, and thereby cause the vehicle to move forwardly, the draft on the swinging push arm or frame will be forward, and while tending to swing the arm or frame I in like direction such forward swing will tend to raise the body-frame, it being also seen that the wheel will be caused to run in a forward direction, and thereby push the arm or frame forward, so as to propel the wheeled vehicle. When the body-frame suddenly sinks and depresses the body-springs N as the result of passing over some inequality in or on the road-bed, the axis about which the arm or frame I is hung is of course correspondingly lowered, and thereby the propelling traction-wheel is relatively pushed back against the then increasing spring resistance of the traction-spring, whereby jar or jolt is taken up by the traction-spring. The arm or frame I can obviously be of one or more pieces or component parts or of separate side pieces attached to the traction-wheel axle or otherwise suitably connected therewith, it being understood that the draft or tension arm or frame broadly includes any and all of such constructions and that said arm or frame may be termed a "propelling" arm or frame, since it forms a push and also a pull connection between the propelling traction-wheel and body or body-frame of the vehicle. The spring which constantly urges the propelling-arm to swing from an inclined toward an upright position is herein termed a "traction-spring," whether composed of one or more spring members or sections, it being seen that the spring is constantly under stress during operation, whereby its energy is constantly exerted to cause the traction-wheel to have sufficient tractive power or rolling friction to propel the vehicle.

The propelling arm or frame I may also be termed a "draft" arm or frame, whether it acts as a thrust bar or frame or as a pull bar or frame, it being observed that the traction-spring causes a draft on said arm or frame. For example, in Fig. 1 the spring G causes a downdraft on the traction propelling-wheel, and it also causes a forward draft on said wheel, thereby maintaining suitable tractive power on the part of the wheel, and necessarily this downdraft is exerted upon the free end portion of the draft or propelling bar I, and likewise the forward draft of the spring G exerts a forward thrust or draft upon said swinging arm or frame. The traction-wheel is preferably arranged under the body-frame and in a plane between the side running-wheels of the vehicle, as illustrated, whereby the entire draft attachment can be arranged and partially concealed under the body-frame.

With further reference to the spring-truss hereinbefore mentioned it is understood that while the form of side spring shown enters into the construction of the truss the side springs can be replaced by transverse end body-springs, or transverse body-springs can be used in addition to the side springs N.

The traction-spring connecting with the swinging arm or frame I tends to raise the axis about which said arm or frame is hung, and thereby it tends to raise the body-frame. On the other hand, depression of the body-frame depresses the axis about which the arm or frame is hung, and such depression is opposed not only by the body spring or springs, but also by the traction-spring, which opposes such depression or downward movement of the body-frame by an increasing spring resistance. With further reference to the spring-truss, Fig. 1, for example, shows said truss comprising the three members 17, K, and I, it being observed that as the spring N is secured to the body-frame and as the upper end portion of the member I is pivotally attached to said body-frame near the attachment of the spring the result is substantially the same as if the upper end of arm I were directly pivoted to the said spring. As clearly shown in Figs. 1 and 2, for example, the inclined arm or frame to which the traction propelling-wheel is attached is pivotally attached at its upper end at a point back of the front axle or axis of the front wheels A and forward of the axle or axis of the rear wheels B. Also, as shown, the inclined swinging arm or frame which inclines downwardly and rearwardly from its point of its pivotal connection with the body-frame is of a length to permit the traction propelling-wheel which is attached to its lower and rear end portion to be positioned forward of the rear axle D, whereby the traction-wheel may rise without striking the rear axle, and it will also be observed that by this arrangement I can employ a comparatively large traction-wheel having ample peripheral traction-surface and also that the traction-wheel may stand higher than the axle of the rear wheel, as shown, for example, in Fig. 1. In practical operation this becomes a matter of importance, as the traction-wheel will sometimes rise in riding over a stone or small obstacle in the road, and, moreover, it frequently happens that along a country road the wheel-ruts are considerably depressed below the level of the middle portion of the narrow road or beaten track. It is also necessary that the spring tension should not be too much relaxed or exhausted when the traction propelling-wheel dips or runs into a depression along the road, and by employing a long tension-spring extending forwardly from the rear end of the inclined push or propelling arm forward swing of the latter, while relaxing to some extent the tension, will not be sufficient to relax such tension to an objectionable extent. It is also desirable to make the said propelling arm or frame comparatively short, whereby its effectiveness is increased.

What I claim as my invention is—

1. In a motor-vehicle, a body-frame mounted upon running-wheels; a spring-truss provided with a traction propelling-wheel and consisting of a body-spring between and connecting the body-frame and a wheel-supported axle, a normally inclined arm or frame having its upper end portion pivotally attached to the body-frame and provided at its lower end portion with the supporting traction propelling-wheel, and a spiral tension-spring extending forwardly from the lower end portion of the inclined swinging arm or frame and urging such arm or frame to swing in direction to bring the axis of the traction-wheel toward a position under the axis about which the arm or frame is hung to swing; an engine supported upon the vehicle; and power-transmitting connection between the engine and the traction propelling-wheel.

2. In a motor-vehicle, a body-frame supported upon front and rear wheeled axles; a spring-truss provided with a traction propelling-wheel and consisting of a body-spring between and connecting the body-frame and the forward wheel-supported axle, a normally inclined arm or frame having its upper end portion pivotally attached to the body-frame and provided at its lower end portion with the supporting traction propelling-wheel, and a spiral tension traction-spring between the forward axle and the lower portion of the swinging arm or frame, and urging such arm or frame to swing in direction to bring the axis of the traction-wheel toward a position under the axis about which the arm or frame is hung to swing; an engine supported upon the vehicle; and power-transmitting connection between the engine and the traction propelling-wheel, said propelling-wheel being forward of the rear axle.

3. In a motor-vehicle, a body-frame supported upon front and rear wheeled axles and body-springs arranged in the supporting connection between the body-frame and said wheels; an engine upon the body-frame; a normally inclined arm having its upper end pivotally attached to the body-frame and extending downwardly and rearwardly from the axis about which it is thus hung to swing; a traction propelling-wheel attached to and supporting the lower end portion of the said swinging arm or frame and arranged forward of the rear axle; a traction-spring urging the said pivoted arm or frame to swing forwardly and opposing depression of the body-frame with an increasing spring resistance; a sprocket rigid with the propelling traction-wheel; an upper sprocket supported to revolve about the axis of the pivotal connection between the swinging arm or frame and the body-frame; power-transmitting connection between the upper sprocket and the engine; and a driving-belt between said sprocket on the body-frame and the sprocket which is rigid with the traction propelling-wheel.

4. The combination with a vehicle constructed with a body-frame supported by springs upon front and rear wheel-supported axle-bars, of an engine supported upon the body-frame; a traction propelling-wheel arranged between the opposite planes of the side wheels and forward of the rear axle; a push bar or frame hung to swing under the body-frame and having its upper end portion pivotally attached to the body-frame and its lower end portion connected with the traction propelling-wheel, said swinging arm or frame being inclined downwardly and rearwardly from its connection with the body-frame; a tension-spring connecting the lower end portion of the swinging arm or frame with a suitable forward portion of the vehicle and constantly urging the swinging arm or frame to swing forwardly; and power-transmitting connection between the engine and the traction propelling-wheel.

5. In a motor-vehicle a body-frame supported by side springs upon front and rear wheeled axles, a normally inclined swinging arm or frame provided at one end with a traction propelling-wheel and a driving-sprocket therefor, and at its opposite end pivotally attached to the body-frame, the said traction propelling-wheel being arranged forward of the rear axle with which the vehicle is provided; a sprocket-wheel supported to revolve about the axis of the pivotal connection between the swinging arm or frame and the body-frame; an engine upon the body-frame; power-transmitting connection between the engine and said upper sprocket; driving connection between the two sprockets; a tension-spring connecting the lower portion of the swinging arm or frame with a forward portion of the vehicle and extending under the axis about which the swinging arm or frame is hung.

6. In a motor-vehicle, a body-frame; a body-spring secured thereto and supported upon wheeled axles; a normally inclined arm or frame pivotally attached to the body-frame at its upper end and having its lower rear end portion provided with a traction propelling-wheel; a tension-spring connecting the lower end portion of the swinging arm or frame with the front axle and extending under the axis about which the swinging arm or frame is hung; and means for driving the traction propelling-wheel.

7. In a motor-vehicle, a wheeled body-frame; a propelling device consisting of a normally inclined arm hinged at its upper end upon the body-frame and provided at its lower rear end portion with and by a tension propelling-wheel and a traction-spring extending forward from the lower rear end portion of the swinging arm or frame and urging the same to swing in direction to bring the axis of the traction-wheel under the hinge connection between said swinging arm or frame and the body-frame and means under control of an occupant of the vehicle for regulating the tension of the tension-spring.

8. In a motor-vehicle, body-frame supported by front and rear wheels; a normally inclined swinging arm or frame arranged under the body-frame and extending downwardly and rearwardly and having its lower end portion provided with a traction propelling-wheel arranged forward of the axis of the rear wheels, and having its upper forward end portion pivotally hung upon the body-frame; a sprocket rigid with the traction propelling-wheel; a transverse shaft or rod upon the body-frame and providing a pivot upon which the said swinging arm or frame is hung; a rotary sleeve supported upon said rod and provided with two sprockets; means for connecting one sprocket of said sleeve with an engine; and a link belt connecting the other sprocket of said sleeve with the sprocket which is rigid with the traction propelling-wheel, and a spring normally urging the swinging arm or frame to swing in a direction to bring the axis of the traction propelling-wheel toward a point under the axis about which said swinging arm or frame is hung.

9. In a motor-vehicle, a wheeled body-frame; a normally inclined swinging arm arranged under the body-frame and having its upper forward end hinge-connected with the body-frame and having its lower rear end portion provided with a traction propelling-wheel; an engine or motor on the vehicle and power-transmitting connection between such engine or motor and the traction-wheel; a tension-spring connected with the lower rear portion of the swinging arm and also connected with the vehicle forward of the traction propelling-wheel and arranged to urge the normally inclined arm to swing in direction to bring the axis of the traction-wheel toward a point below the axis about which said swinging arm is arranged to swing, and means for raising and temporarily holding the traction-wheel free from the ground and consisting of a lifting device connected with the swinging arm and available to an occupant of the motor-vehicle, said device being arranged for swinging upwardly the said swinging arm to an extent to raise the traction-wheel, and for holding said swinging arm in such raised position against the tension of the spring.

10. In a motor-vehicle, a body-frame supported by springs upon front and rear wheel-axles; a normally inclined swinging arm or frame having its upper forward end pivotally attached to the body-frame at a point between the front and rear axles, and having its lower end portion provided with and supported by a traction propelling-wheel arranged between planes of the rear running-wheels of the vehicle and forward of the axis of the rear wheels; an engine mounted upon the vehicle; power-transmitting connection between the engine and the traction propelling-wheel for operating the latter; and a traction-spring urging the swinging arm or frame to swing forward and thereby press down the traction propelling-wheel; the weight of the body-frame being partially sustained by the traction-spring, the traction propelling-wheel, and the swinging arm or frame which operates as a thrust-bar when the traction-wheel is forwardly revolved.

11. In a motor-vehicle, a body-frame supporting an engine and constructed with longitudinally-arranged angle-bars L forming opposite side bars of the frame, and a transversely-arranged rod or bar 9 secured at its ends to the angle-bars; an arm or frame comprising members 6 hung upon the rod 9 and connected by an axle 8 having a traction propelling-wheel mounted thereon; a sleeve arranged to revolve upon the rod 9 and provided with two sprockets, one of said sprockets being connected by a link belt with a sprocket on the axle 8, and the other sprocket on said sleeve being connected with a sprocket driven by the engine, and springs connected with the swinging arm or frame and urging the latter to swing downwardly and forwardly.

12. In a motor-vehicle, a body-frame; a normally inclined swinging arm or frame pivotally attached to the body-frame and swinging about a transverse axis back of the forward end of the body-frame; a traction propelling-wheel mounted upon the lower end portion of the swinging arm or frame and a traction-spring comprising spring-sections attached to the lower end portion of the swinging arm or frame and extending forwardly and attached to the vehicle at points forward of the transverse axis about which the said arm or frame is hung to swing; an engine mounted upon the body-frame and power-transmitting connection between the engine and the traction propelling-wheel.

13. In a motor-vehicle, a body-frame; front and rear wheeled axles; springs supporting the body-frame upon the front and rear axles; a traction propelling-wheel arranged between the planes of the rear wheels and forward of the rear axle; an arm or frame connected with an axle or journal for the traction propelling-wheel and extending upwardly and forwardly therefrom and having its upper end pivotally connected with the body-frame in rear of the front axle; an engine or motor supported upon the body-frame; power-transmitting connection between the engine or motor and the inclined swinging arm; and a traction-spring urging the inclined arm to swing in direction to move the axis of the traction propelling-wheel toward a point under the axis about which the inclined arm is hung to swing.

14. In a motor-vehicle, a wheel-supported body-frame; a traction propelling-wheel arranged under the body-frame; an inclined arm or frame tied to and extending forwardly and upwardly from the axis of the traction propelling-wheel and having its upper end portion pivotally attached to the body-frame; a motor and power-transmitting connection between the motor and the traction propelling-wheel; and coiled tension-springs connected at their rear ends with the axis of the traction propelling-wheel and diverging forwardly therefrom, the forward ends of these springs being connected with the front axle of the vehicle.

15. In a motor-vehicle, a wheel-supported body-frame with supporting-springs arranged between the body-frame and wheels; a traction propelling-wheel under the body-frame between the axes of the front and rear wheels; an inclined swinging arm or frame connecting the body-frame with the traction propelling-wheel and made adjustable in length; tension-springs connecting the lower rear end portion of the inclined swinging arm or frame with the vehicle at a point forward of the pivotal connection between the inclined swinging arm or frame and the body-frame; an engine or motor; and power-transmitting connection between the engine or motor and the traction propelling-wheel.

16. In a motor-vehicle, a body-frame spring-supported upon front and rear wheels; an inclined swinging arm or frame pivotally attached to the body-frame and inclining downwardly and rearwardly from its point of attachment; a traction propelling-wheel attached to the lower rear end portion of the inclined arm or frame; and spring means for urging the inclined arm to swing forward and comprising a tension-spring at the forward end of the vehicle.

17. In a motor-vehicle, a body-frame spring-supported upon front and rear wheels; an inclined swinging arm or frame pivotally attached to the body-frame and inclining downwardly and rearwardly from its point of attachment; a traction propelling-wheel attached to the lower rear end portion of the inclined swinging arm or frame; and spring means for urging the inclined arm or frame to swing forward and comprising a couple of reversely-wound tension-springs and connection between such springs and the lower rear end portion of the inclined swinging arm.

GEORGE T. GLOVER.

Witnesses:
CHARLES G. PAGE,
OTTILIE C. FREIBERG.